Figures 1, 2:
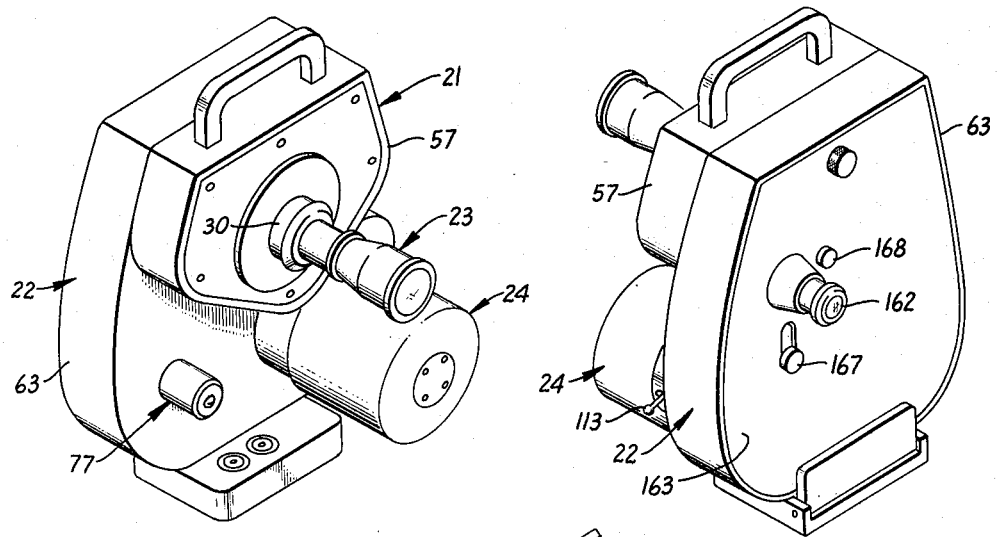

July 5, 1966  E. M. WHITLEY ETAL  3,259,448
HIGH SPEED MOTION PICTURE CAMERA
Filed Dec. 5, 1963  5 Sheets-Sheet 1

INVENTORS
ERNEST M. WHITLEY
ALFRED K. BOYD
ELMER J. LARSEN
BY Schapp & Hatch
ATTORNEYS July 5, 1966 E. M. WHITLEY ETAL 3,259,448
HIGH SPEED MOTION PICTURE CAMERA
Filed Dec. 5, 1963 5 Sheets-Sheet 3

INVENTORS
ERNEST M. WHITLEY
ALFRED K. BOYD
BY ELMER J. LARSEN
Schapp & Hatch
ATTORNEYS

INVENTORS
ERNEST M. WHITLEY
ALFRED K. BOYD
ELMER J. LARSEN

INVENTORS
ERNEST M. WHITLEY
ALFRED K. BOYD
ELMER J. LARSEN
BY
Schapp & Hatch
ATTORNEYS 3,259,448
HIGH SPEED MOTION PICTURE CAMERA
Ernest M. Whitley, Palo Alto, Calif., Alfred K. Boyd, Houston, Tex., and Elmer J. Larsen, La Honda, Calif., assignors to Red Lake Laboratories, Inc., Sunnyvale, Calif., a corporation of California
Filed Dec. 5, 1963, Ser. No. 328,376
21 Claims. (Cl. 352—84)

This invention relates to improvements in a high speed motion picture camera, and more particularly to cameras in which a rotating prism throws the individual images onto a film strip moving continuously at a speed equivalent to the speed of rotation of the prism so as to effect optical compensation.

The camera of the present invention is capable of taking pictures at frame rates of over 10,000 frames per second. Science and industry have long felt a need for a lightweight, compact and relatively inexpensive camera capable of such framing speeds. The present camera not only satisfies these criteria, but also provides steadiness on projection and versatility not heretofore obtainable.

The disadvantages of intermittently starting and stopping the film in high speed cameras are well known, as is the desirability of utilizing a smooth running film together with rotating means for effecting optical compensation of the image so it will occupy the same spot on the moving film throughout the exposure of each frame. Two types of optical compensation have been proposed—reflection from rotating mirrors, and refraction through rotating prisms. It is the latter type of compensation with which the present invention is concerned.

Previous high speed cameras incorporating rotating prism compensation have found it necessary to provide elaborate gear trains for obtaining the necessary synchronization between the speed of the film and the speed of rotation of the prism. Even though the gear trains are fabricated with expensive precision, accumulated backlash and bearing run-out seriously affect the quality of the picture, and particularly its steadiness when projected upon a screen.

Picture quality is also affected by divergence between the emulsion of the film and the plane of sharpest focus of the image. As the prism rotates, this plane of sharpest focus acquires a lateral component of movement normal to the axis of the prism. In certain prior cameras, the film passes over a cylindrical sprocket at the image-receiving location and this bends the film in an opposite direction of curvature so that the image tends even more to be out of focus at the beginning and end of the exposure if it is in focus during the middle of the exposure.

Because of the necessity of mounting the rotating prism between the objective lens assembly and the back focal plane of this lens, it has heretofore been necessary to utilize special lenses having a long back focal length together with special lens mounts. The requirement for such special equipment, of course, greatly increases the cost and reduces the utility of the camera.

It is, therefore, a principal object of the present invention to provide a light-weight, compact and inexpensive high speed motion picture camera capable of framing rates in excess of 10,000 frames per second and which provides remarkable steadiness on projection by eliminating bearing run-out and gear backlash.

Another object of the invention is to provide a high speed motion picture camera having improved rotating prism optical compensation producing sharp and clear pictures of uniform exposure over the entire framing area.

A further object of the invention is to provide a high speed camera of the character described which will accommodate all of the commonly available film types, thicknesses and perforations and which utilizes a standard "C" lens mount adapted to receive a wide variety of inexpensive lens systems, the camera accommodating lenses of almost any readily available focal length.

A still further object of the present invention is to provide a high speed camera of the character set forth which affords direct through-the-lens viewing and focusing and which is adapted for simultaneous oscilloscope and event recording, frame by frame.

Yet another object of the invention is to provide a high speed camera affording rapid and easy selection of shutter ratios and frame sizing and location on the film.

Another object of the invention is to provide a high speed motion picture camera of the character described in which a smooth starting action and rapid stopping action when the film supply is exhausted cooperate with film directing devices and structures so as to prevent the film breakage, chipping or other damage by overstressing, whipping, shattering, overriding or the like.

Another object of the invention is to provide a high speed camera incorporating means for producing event controlling signals synchronized with and responsive to the actual footage of film removed from the film feed spool, together with easy and simple adjustments of the point in the film run at which the signal is effected.

Another object of the invention is to provide a light-weight, compact, inexpensive high speed moving film strip camera incorporating a unitized optical head which may be easily and rapidly dismounted from and replaced on any of several magazine units of different film capacity.

Further objects and advantages of the invention will be apparent as the specification progresses, and the new and useful features of the present high speed motion picture camera will be fully defined in the claims attached hereto.

Figure 3:
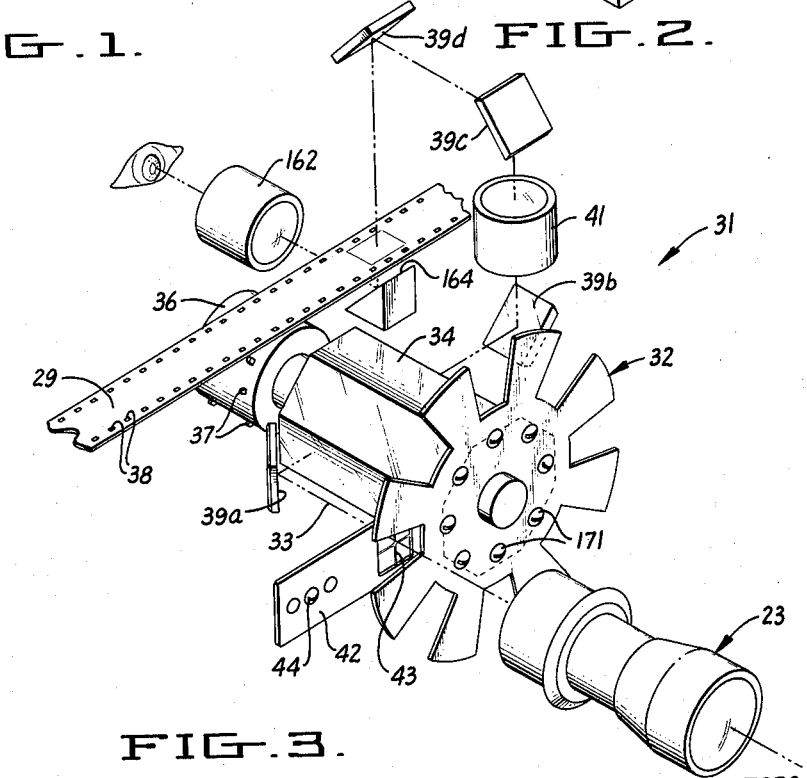
Figure 4:
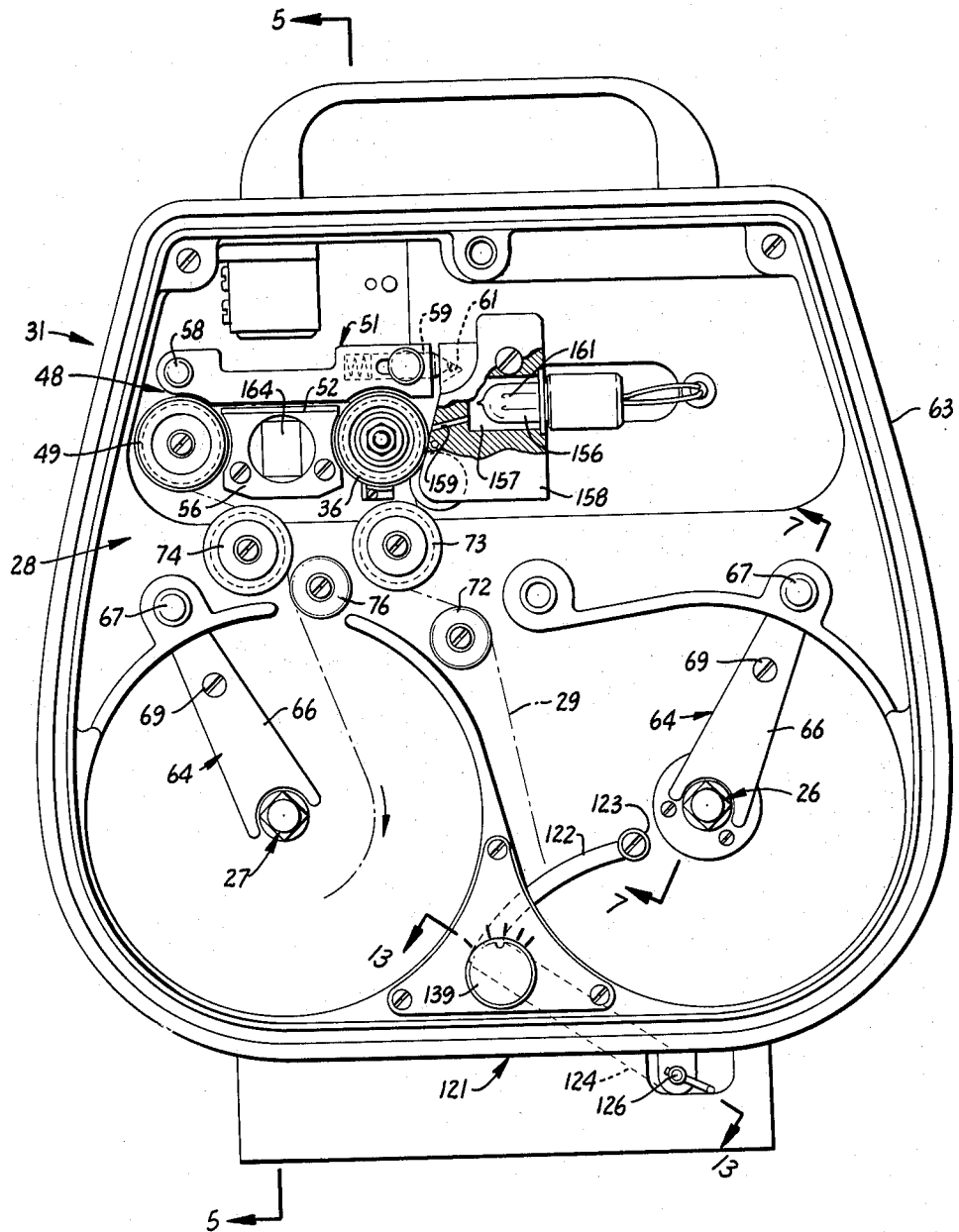
Figure 8:
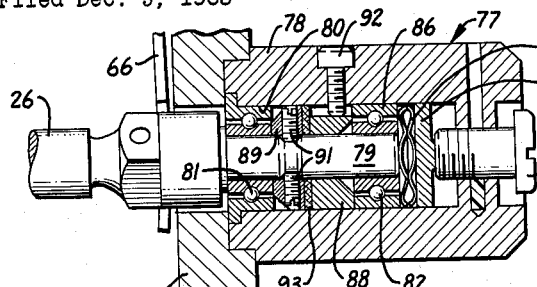
Figure 7:
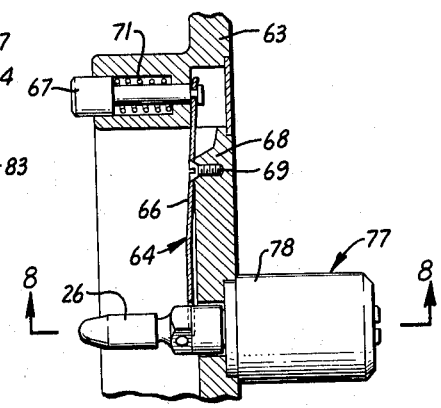
Figure 6:
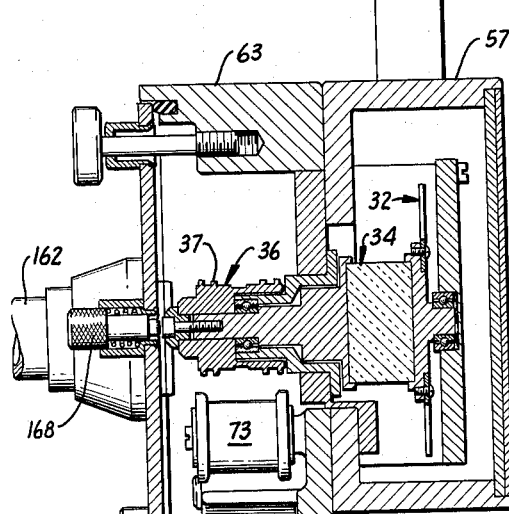
Figure 6:
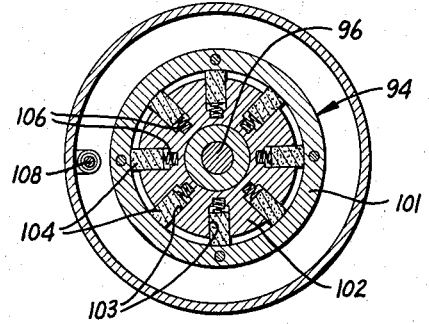
Figure 5:
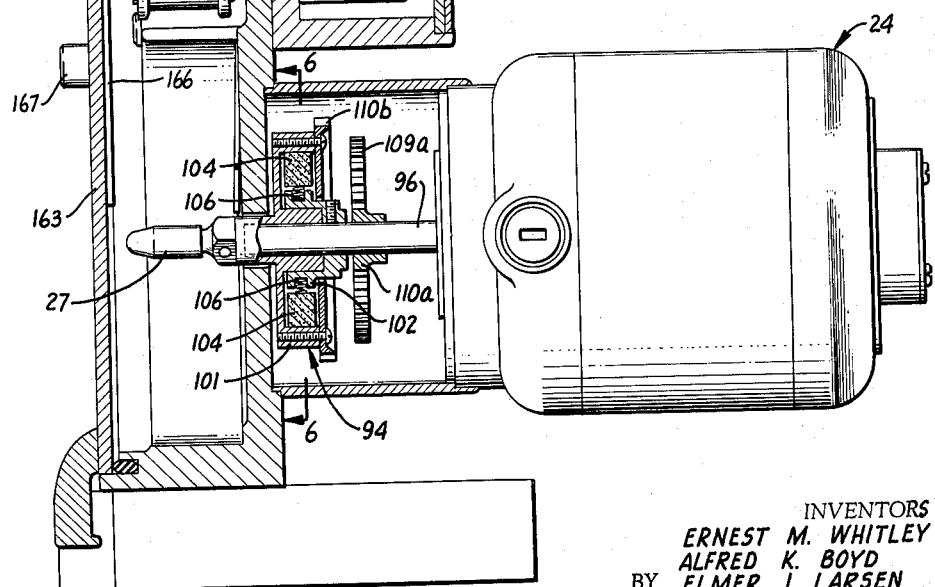
Figure 9:
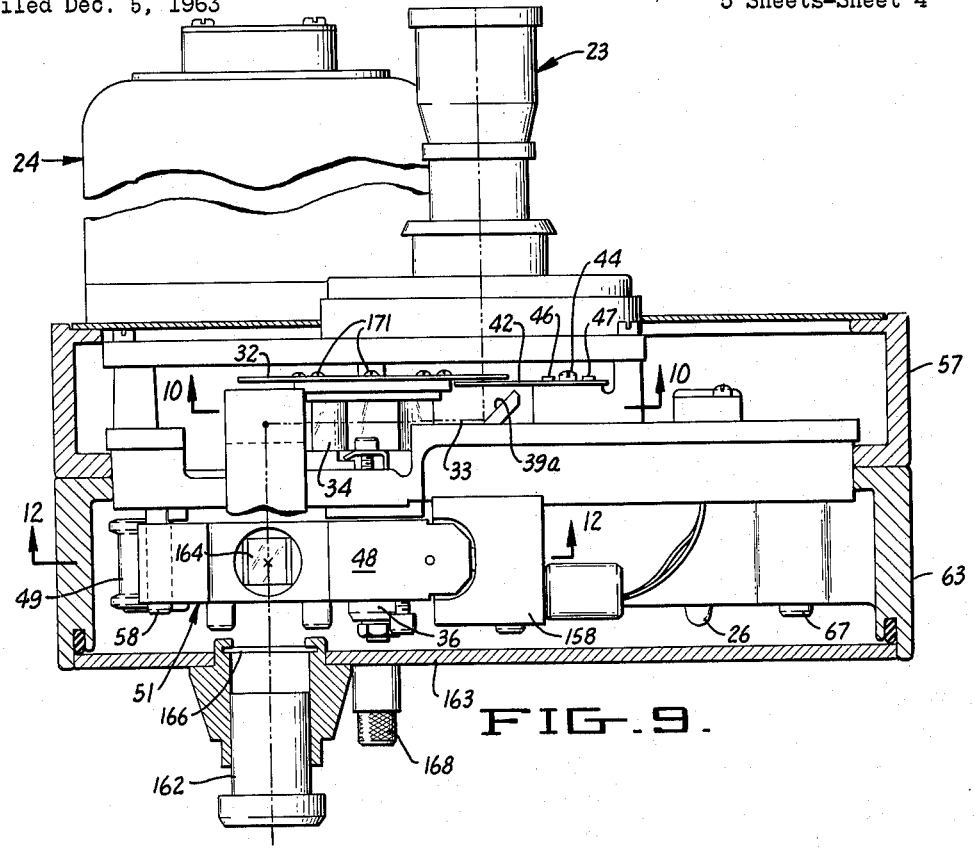
Figure 10:
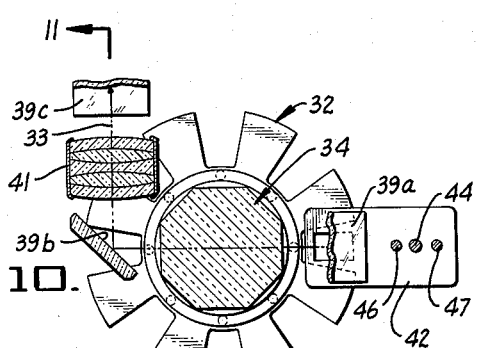
Figure 11:
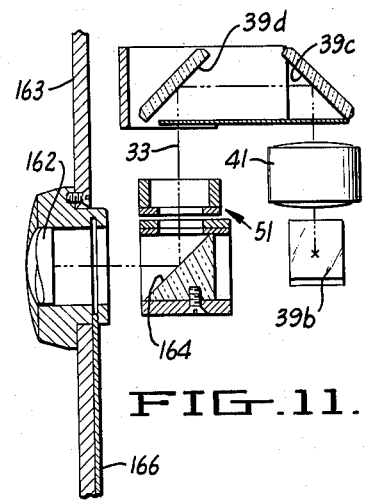
Figure 12:
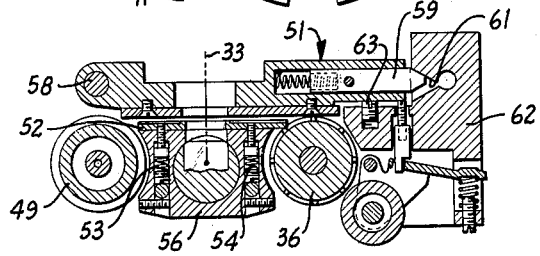
Figure 15:
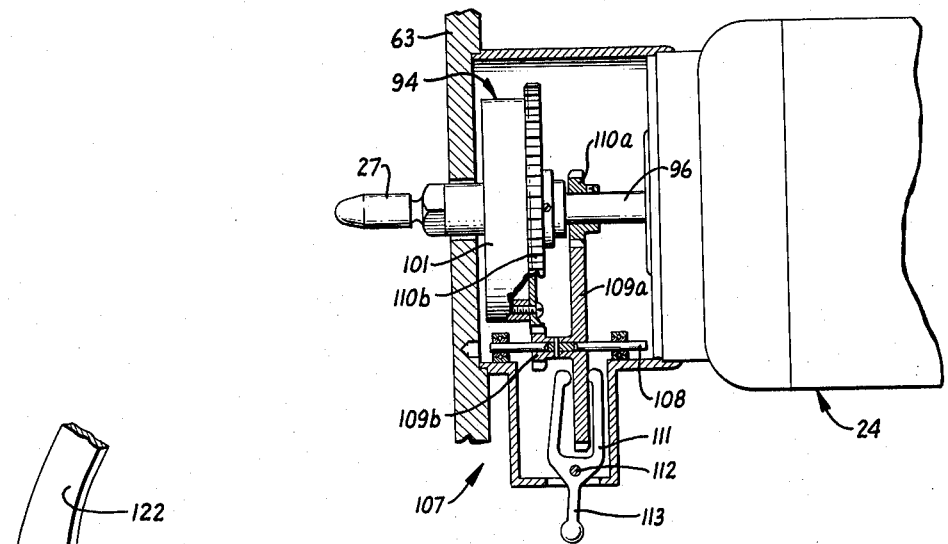
Figure 14:
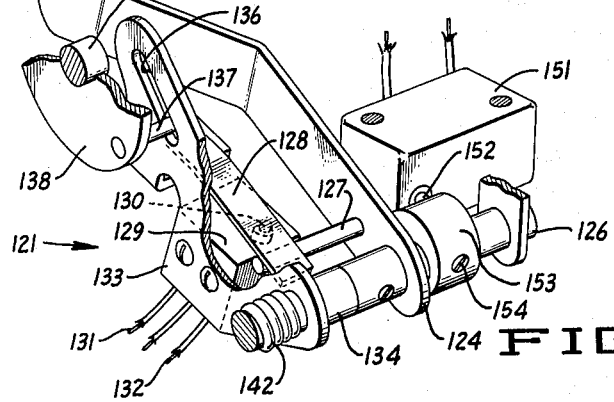
Figure 13:
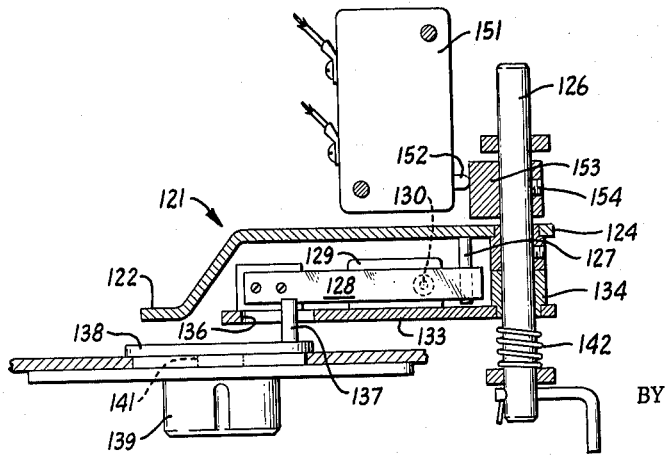

The preferred form of the invention is illustrated in the accompanying drawings forming part of this specification, in which:

FIGURE 1 is a perspective view of a high speed motion picture camera constructed in accordance with the present invention;

FIGURE 2, a rear perspective view of the camera of FIGURE 1;

FIGURE 3, an enlarged diagrammatic view of the principal optical components of the camera of FIGURE 1;

FIGURE 4, an enlarged rear elevational view of the camera of FIGURE 1 with the rear door removed;

FIGURE 5, a vertical cross-sectional view taken substantially on the plane of line 5—5 of FIGURE 4;

FIGURE 6, a vertical cross-sectional view taken substantially on the plane of line 6—6 of FIGURE 5;

FIGURE 7, a fragmentary cross-sectional view taken substantially on the plane of line 7—7 of FIGURE 4;

FIGURE 8, an enlarged sectional view taken substantially on the plane of line 8—8 of FIGURE 7;

FIGURE 9, a top plan view of the camera of FIGURE 1 with portions broken away and shown in section for clarity of illustration;

FIGURE 10, a vertical cross-section taken substantially on the plane of line 10—10 of FIGURE 9;

FIGURE 11, a vertical cross-section taken substantially on the plane of line 11—11 of FIGURE 10;

FIGURE 12, a vertical cross-section taken substantially on the plane of line 12—12 of FIGURE 9;

FIGURE 13, a cross-sectional view of an event synchronizer taken substantially on the plane of line 13—13 of FIGURE 4;

FIGURE 14, an enlarged perspective view of the event synchronizer of FIGURE 13 with portions being broken away and shown in section for clarity of illustration; and FIGURE 15, a typical enlarged longitudinal sectional view through a gear reducing means forming part of the camera of FIGURE 1.

While only the preferred form of the invention is shown, it should be understood that various changes or modifications may be made within the scope of the claims attached hereto without departing from the spirit of the invention.

Referring to the drawings in detail, it will be seen that the high speed motion picture camera of the present invention consists basically of an optical head assembly 21 mounted on a film magazine unit 22, the optical head 21 providing a mount for an objective lens system 23 and the unit 22 incorporating a drive means 24. Also mounted in unit 22 are film supply and take-up spindles 26 and 27 and roller means 28 positioned to guide the film 29 through an optical system 31 adapted to project a series of images onto the moving film.

FIGURE 3 of the drawings is a diagrammatic representation of the major components of the optical system 31. As there shown, a rotary segmented type disk shutter 32 is mounted in the beam of light 33 entering the camera through the objective lens system 23. Shutter 32 is of the conventional type having equally spaced cut-out portions around its circumference and is adapted for interrupting the beam of light 33 to provide exposures of equal duration, the length of the exposure being determined by the width of the cut-out segments and the speed of rotation of the shutter.

A multiple facet motion compensating refracting prism is mounted for rotation in the path of the beam of light 33 and functions in a well known manner to displace the image formed by rays of light passing through the prism in accordance with its speed of rotation. The rate of displacement of the image is equal to the speed of movement of the film strip 29. Thus, the image is projected onto the same area of the film during the entire exposure as determined by the shutter 32.

In order to synchronize the rotation of the shutter 32, the rotation of the prism 34 and the speed of the film strip 29, the shutter and prism are operatively connected for joint rotation to a sprocket 36 journaled for rotation about its own axis. Sprocket 36 is provided with sprocket teeth 37 adapted for engagement with sprocket holes 38 conventionally provided adjacent one or both edges of the film strip. Preferably, the diameter of the sprocket is small enough that only three or four teeth engage in the holes at any one time. This makes it possible to use films incorporating any usual high speed sprocket hole spacings without damage to the film as would be the case were several thousandths of an inch variation accumulated over a larger number of teeth.

In accordance with the present invention and as an important feature thereof, shutter 32, prism 34 and sprocket 36 are all secured together for joint rotation about the axis of rotation of the sprocket. This completely eliminates any necessity for gear trains, chain drives or the like, and hence eliminates any problem of backlash or bearing run-out. As illustrated, a compact and convenient assembly is formed by attaching prism 34 to the shaft of sprocket 36 and attaching shutter 32 to the opposite end of the prism.

The securing together of the shutter 32, prism 34, and sprocket 36 for joint rotation about the same axis is made possible by optical means capable of bending the beam of light 33 to pass through the shutter and prism and onto the film in the desired sequence. Any suitable means having these properties may be employed but preferably and as here shown, this means includes a plurality of reflecting surfaces 39a, 39b, 39c, and 39d, which may be provided by small mirrors suitably mounted in the optical head 21.

Because of the requirement that the light path be deflected several times in order to pass sequentially through the shutter and prism and onto the film near the sprocket 36, the beam of light must traverse a path of considerable distance from the objective lens system 23 to the film 29. This would require an objective lens having a back focal length greatly in excess of any normally available lenses. However, an important feature of the present camera is its ability to use ordinary, commonly available lenses of relatively short back focal length such as the widely available lenses adapted for mounting in the conventional "C" mount. Thus, the present camera is provided with a "C" mount 30 and through the use of widely available adapters can be used with a wide variety of available lenses.

This is made possible in the camera of the present invention by the provision of a re-imaging lens system 41 mounted in the beam of light 33. The re-imaging lens system 41 is formed for picking up the image resolved at the back focal plane of the objective lens system and for refocusing the beam of light to produce a sharp image at the plane occupied by the emulsion of the film strip 29. The re-imaging lens may be of any suitable type and as here shown may conveniently be mounted in the path of the beam of light 33 between mirrors 39b and 39c.

As a further advantageous feature of the present invention, the re-imaging system makes it possible to locate a framing mask 42 at the back focal plane of the objective lens 23. With this construction, the framing masks 42 provide sharp definition of the frames and at the same time may easily and conveniently be changed to provide frames of varying size and shape. In addition, because the framing mask 42 is positioned at the back focal plane of the objective lense system 23, the mask may be provided with fiducial indicia such as crosshairs 43, and these indicia will be in sharp focus when the image is projected onto the film strip. The framing mask 42 is here provided in the form of a thin rectangular plate having the desired framing area left open and is removably mounted in place by means of a machine screw 44 and dowel pins 46 and 47 engaging in openings formed through the plate 42.

In accordance with the present invention, means 48 is provided for holding the film in substantially flat condition at the location where the image falls upon the film. As seen in FIGURE 4 of the drawings, the film, during its journey through the camera, passes around sprocket 36 and horizontally to an idler roller 49. Interposed between sprocket 36 and idler roller 49 is a film gate 51 adapted to insure that the film passing the image-forming area is held in a substantially flat plane.

Details of construction of the film gate may be seen in FIGURE 12 of the drawings wherein a pressure plate 52 is pressed upwardly against the film by springs 53 and 54 mounted in bores in a housing 56 which is in turn supported on the housing 57 for the optical head assembly 21. The film gate 51 is pivoted on a shaft 58 for swinging movement downwardly against the film and is releasably held in such position by a spring loaded detent 59 engaging in a depression 61 formed in a member 62 secured to the housing 57. A limit screw 65 provides for adjustment of the spacing between film gate 51 and pressure plate 52.

Easy operation of the present camera is facilitated by fabricating the feed and take-up spindles 26–27 to accommodate standard daylight loading film spools. The housing 63 for the film magazine unit is formed with circular wells dimensioned to accept the daylight loading spools with a minimum celarance. Push-out devices 64 are provided for ejecting the film spools when desired, and consist of spring arms 66 adapted for popping the film spools out of the wells when a button 67 is depressed to force one end of the arms inwardly, causing them to pivot about a supporting shoulder 68. The arms are held in place by loosely engaged screws 69 and are returned to retracted position by a compression spring 71.

As seen in FIGURE 4, the film passes around idling rollers 72 and 73 before reaching sprocket 36 and proceeds between idling rollers 74 and 76 after leaving the roller 49. This guiding of the film around the rollers cooperates with the structure of the film wells to substantially reduce whipping and breakage of the end of the film as it passes from the feed spool onto the take-up spool.

Means 77 is provided on the supply spindle 26 for preventing overriding of the supply spool, that is, rotation of the supply spool faster than the film is being removed. This avoids damage to the film because of backlash or tangling and aids in bringing the mechanism to a smooth and rapid stop when the drive means 24 is de-energized. As may best be seen in FIGURES 7–8 of the drawings, means 77 includes a subhousing 78 secured to the film magazine unit housing 63 and formed with an internal bore 80 adapted to receive the reduced end 79 of spindle 26. End 79 is journaled for rotation in ball bearings 81 and 82 carried within bore 80. A screw 83 threaded in the housing 78 extends coaxially into bore 80 and serves to exert controlled axial force against a sliding member 84.

Member 84 presses against the outer race 86 of bearing 82 through corrugated spring washers 87 and the race 86 in turn displaces a ring member 88 toward a collar 89 secured to shaft end 79 by set screws 91. Ring 88 is formed with an axially extending slot in its periphery in which a set screw 92 is slidably engaged so as to retain ring 88 against rotation but permit freedom of axial movement. A clutch disk 93 formed of cork having both faces covered with finely divided molybdenum disulfide is interposed between collar 89 and ring 88. Rotation of screw 83 urges ring 88 toward collar 89 squeezing the cork ring 93 therebetween and creating a drag on the spindle 26, the amount of drag being controlled in accordance with the advance of screw 83. At low film speeds, no drag is necessary, but at higher framing speeds the drag should be used.

Further provision for preventing damage to the film is made in the form of centrifugal clutch means 94 connecting the motor drive shaft 96 to the take-up spindle 27, the clutch means being effective for providing smooth action in starting rotation of the take-up spool and bringing it up to the desired speed without sudden jerks which might overstress the film and cause breakage.

As will be apparent from the following detailed description of the structure of the centrifugal clutch means 94, the clutching action will be significantly greater at higher motor speeds. Thus, when the motor is first energized the clutching action will be limited and slippage can occur to avoid undesired jerking of the take-up spool.

As shown in FIGURES 5 and 6 of the drawings, the clutch means 94 includes a drum 101 secured to spindle 27 for rotation therewith. A member 102, formed with a plurality of radial slots 103, is secured to the motor drive shaft 96 for rotation within drum 101. Mounted in the slots 103 for radial sliding movement outward into engagement with the inner periphery of drum 101 are a plurality of shoe elements 104. Springs 106 are mounted in the bottom of the slots between the member 102 and the shoe elements 104 for urging the latter outwardly toward the brake drum.

Upon initial movement of the motor shaft 96 and attached member 102, rotative force is transmitted to drum 101 by the frictional contact of the shoe elements 104 with its inner periphery. The springs 106 are relatively weak so as to allow a limited amount of slippage between member 102 and drum 101. As the speed of rotation of the unit increases, centrifugal force urges the shoe elements 104 outwardly exerting increasing pressure and hence increasing frictional contact between the shoe elements 104 and the drum 101. At the higher motor speeds, the unit "locks up" and, in effect, provides a solid drive connection.

Control over the speed of rotation of the take-up spindle, and hence over the framing rate of the camera, is accomplished by controlling the speed of the drive means 24. Preferably, the drive means 24 includes a universal series wound A.C.-D.C. motor of the type commonly used with small appliances. The speed of rotation of the motor 24 may be controlled by any suitable devices such as the well known and widely available Variac or Powerstat auto transformer. The universal series wound A.C.-D.C. motor permits use of alternating current at higher speeds when power demand is greatest and direct current at lower speeds. The speed of the camera may readily be pre-set by choosing the proper voltage from the motor characteristic curves in the manner well known in the art.

At times it is highly desirable to be able to slow the framing rate of the camera down to speeds as low as, say, ten frames per second. Such low speeds would require a drive motor having a larger range of speeds than those commercially available at relatively low cost. Accordingly, the present invention provides means for slowing down the framing rate, when desired, to provide a film strip speed lower than the corresponding speed of rotation of the motor. This is accomplished by means 107 formed for selectively connecting the motor shaft 96 to the take-up spindle drum 94 through a set of reducing gears.

As here shown, a jack shaft 108 carrying spur gears 109a and 109b is supported for endwise movement to bring such gears into and out of mesh with spur gears 110a and 110b secured to the motor shaft 96 and drum 94, respectively. Gears 109b and 110a have a much smaller pitch diameter than gears 109a and 110b and hence the gear set provides considerable speed reduction between the shaft 96 and drum 94. Endwise movement of jack shaft 108 may be accomplished by any suitable means, manual or powered. As here shown, a yoke 111 is pivoted on pin 112 and provides for manual throw-out by displacing lever arm 113. A powered throw-out, such as by a solenoid, can be provided if desired.

As pointed out above, at low speeds of rotation, the centrifugal clutch means 101 provides a limited clutching action permitting slippage between the shoe elements 104 and drum 101. This characteristic permits the use of the described gear sets to achieve speed reduction by permitting drum 101 to move at a different rate of rotation than motor shaft 96. Thus, disengagement of the reduction gears, by moving jack shaft 108, quickly places the camera in condition for high speed operation without requiring manipulation of clutch means 101.

As an important feature of the present invention, event synchronizing means 121 is provided, such means being adapted for providing an electrical signal at a predetermined point during the film run. This signal, which may be an electrical impulse or the cutting off of a constant signal, may then be used for effecting a changing condition at the object being photographed. The signal may be used to start or stop movement, effect a change of illumination, or provide some other happening which is desired to take place after a specified film footage has been run. Thus, the signal could, for instance, be used to fire a projectile when the camera has reached the desired framing speed. Other uses for the event synchornizer will readily be apparent to those skilled in the art.

In accordance with the present invention, the event synchronizing means 121 is directly responsive to the number of turns of film remaining on the supply spool. To accomplish this, a feeler 122 actually engages the outer periphery of the roll of film on the supply spool and acts to initiate the signal when the radius of such roll is diminished to a desired dimension. The feeler may conveniently contact the film adjacent one or the other of its edges in order to avoid any possibility of interference with the emulsion used for taking the pictures.

As may be seen in FIGURES 4, 13 and 14 of the drawings, the feeler 122 is provided in the form of an arm having a distal end 123 adapted for swinging radial movement toward the spindle 26 so as to bring it into contact with the exterior periphery of the roll of film. This swinging movement is provided by securing the opposite end 124 of the arm to a shaft 126 journaled in the film magazine unit housing 63.

As the arm 122 swings inwardly toward spindle 26, a pin 127 carried thereon engages the free end of a leaf spring urging member 128 away from the actuator 130 of a microswitch 129. It is this movement of leaf spring 128 which causes microswitch 129 to effect the desired electrical signal in active leads 131 and 132. Thus, when feeler end 123 moves inwardly a predetermined distance, pin 127 will displace leaf spring 128 causing microswitch 129 to provide the desired signal.

Adjustment of the point in the film run at which the signal will occur is provided by swinging the microswitch 129 and associated leaf spring 128 relative to the shaft 126. For this purpose, spring 128 and microswitch 129 are secured to an arm 133 which is journaled on shaft 126 by means of bushing 134. The outer end of arm 133 is provided with a slot 136 in which is slidably engaged a pin 137 carried by a disk 138. Rotation of disk 138 thus will cause arm 133 to swing around shaft 126 moving microswitch 129 to a point where it will be actuated by leaf spring 128 when feeler end 123 reaches a desired location because the desired amount of film has been stripped from the supply spool.

Easy and simple adjustment of the event synchronizer is provided by a manually engageable knob 139 secured to a shaft 141 which mounts the disk 138. Coil spring 142 is wrapped around shaft 126 and has its opposite ends connected to the shaft and to the housing so that the spring will tend to urge the end 123 of feeler arm 122 toward spindle 26.

The structure just described also provides convenient means for shutting off the drive motor 24 as the last few feet of film are stripped from the supply spool. This, of course, tends to protect the trailing end of the film which would otherwise be whipped around in the take-up well until the motor was turned off by other means. As shown in FIGURES 13 and 14, the shut-off means is provided by a microswitch 151 mounted in the housing adjacent to shaft 126 and having an actuating member 152 cooperative with a cam 153 secured to shaft 126. The cam 153 is mounted on shaft 126 in position to displace the actuator 152 when the feeler arm end 123 has almost reached the hub of the feed spool. Adjustment of the operation of the microswitch 151 may conveniently be effected by merely loosening set screw 154 and rotating cam 153 to the desired position on shaft 126.

Even though the present camera is able to maintain good speed consistency over most of the film strip, it is very difficult to attain an exact film speed. This is true of most if not all high speed motion picture cameras. In order to provide information as to the actual framing speed at any point on the film, it has become common practice to provide a timing light which flickers on and off at a predetermined number of cycles per second and produces a series of images on the film. Measurement of the length and spacing of these images provides the desired information.

The present camera incorporates a timing light assembly which is adapted to project a well defined spot onto one or both edges of the film outside the sprocket holes. Because of its unique structure, the timing light projects the spot onto the film very close to the point at which the images projected onto the film, say three or four frames away, and this provides accuracy not obtainable in cameras having the timing light spaced much further away from the imaging location.

As may be seen in FIGURE 4 of the drawings, the present timing light consists of a conventional, widely available neon lamp 156 mounted in well 157 formed in a block member 158 secured to the optical head housing 57. Pulses of light from the neon lamp 156 are transmitted to the edge of the film strip as it passes over sprocket 36 through a straight passage 159 formed through block 158. As an important feature of the invention, the inner surface of the well 157 is highly polished to collect all available light and passage 159 is provided in the form of a bore having smooth polished walls capable of acting as a light pipe. The passage 159 is oriented to be aimed at the hot filament 161 of the lamp and this cooperates with the light collecting properties of the well 157 and light piping characteristics of bore 159 to provide a well defined, intense light spot on the film.

If it is desired to provide timing light spots on both edges of the film, a similar neon lamp is mounted in side-by-side relation to lamp 156. The described structure is particularly adapted for use with existing timing light circuits and may even be used with ordinary 60-cycle alternating current if desired.

As an important feature of the present invention, means is provided for direct through-the-lens viewing and focusing. This is accomplished by mounting a viewing lens assembly 162 on the back door 163 of the film magazine unit 22. The viewing lens 162 is aligned with a reflecting surface 164 making it possible to view the film strip 29 from underneath. Focusing is accomplished in the following manner: A line or scratch is drawn on the emulsion of a translucent film leader and the film is advanced to position the scratch in the film gate 48. The viewing lens 162 is manipulated until the scratch or line is in sharp focus. The objective lens system 23 is then manipulated until the image projected upon the translucent film strip is also in sharp focus. After focusing is accomplished, a plate shutter 166 is slid upwardly by means of button 167 to blank off the viewing lens 162. Thus, focusing is effected in a manner similar to that used in ground-glass-backed cameras, and the user need not measure the distance between camera and subject or use range finders, reflex finders or the like. The sprocket 36 may be rotated to move the shutter 32 to open condition by pressing in and rotating spring loaded button 168 which is journaled through the camera back in alignment with the end of the sprocket.

The described focusing structure makes the camera readily adaptable for use with attachments which will project additional information onto the film adjacent to each frame. For example, through the use of different lens systems in place of viewing lens 162, the camera can readily be adapted for recording simultaneous oscilloscope, counter or spark images, or the like, on a portion of each frame.

The camera structure also lends itself readily to being synchronized with other equipment such as electronic flash etc. through the use of a conventional magnetic pick-up. For this purpose, the magnetic pick-up is supported on the front face of optical head housing 57 with the pick-up point in close proximity to the path of travel of a plurality of magnetically responsive screws 171 which are used to secure the shutter 32 to the prism 34. The number of screws 171 corresponds to the number of shutter openings and prism facets and are preferably located at the middle thereof. Thus, on rotation of the shutter, the screw heads 171 will swing past the magnetic pick-up in one-at-a-time order, triggering equipment such as an electronic flash at the proper time to illuminate each frame.

The versatility and capabilities of the present camera are enhanced by providing all of the more critical and expensive components in the optical head assembly 21 which is demountable from the film magazine assembly 22 and which may be remounted upon other film magazine units. Thus, while the standard film magazine unit for this camera is designed to accommodate 100 feet of 16 mm. standard base film, the optical head may be used with film magazine units of other capacities. Also, the provision of the optical head in a separate unitary assembly makes it possible to have reserve film magazine units available so as to cut down reloading time. It should be understood that while the camera shown is particularly adapted for use with 16 mm. moving picture film, either standard base or thin base Mylar film, and other film widths such as 8 mm., 35 mm., etc. may be employed with equal success.

From the foregoing it will be seen that the high speed motion picture camera of the present invention provides a light-weight, compact and relatively inexpensive unit possessing a high degree of versatility and excellent optical and picture-taking characteristics.

What is claimed is:

1. An optical system for a high speed motion picture camera having a moving film strip and an objective lens system, comprising a film sprocket having teeth adapted for engagement with sprocket holes in a strip of film moving therepast for rotating said sprocket about an axis, a rotary segmented type disk shutter connected to said sprocket for joint rotation therewith about the same axis and formed for interrupting the beam of light entering the camera through the objective lens system, and optical means mounted with respect to said axis in position to intercept and direct onto the film strip the interrupted beam of light passing through said shutter.

2. An optical system for a high speed motion picture camera having a moving film strip and an objective lens system, comprising a multiple facet motion compensating prism mounted for rotation about a central axis and positioned in the beam of light entering the camera through the objective lens system, a rotary segmented type disk shutter connected to said prism for joint rotation therewith about the same axis and formed for interrupting said beam of light, drive means having an operative connection with said prism and said shutter for effecting said joint rotation, and optical means mounted with respect to said axis in position to intercept and direct onto the film strip the interrupted beam of light passing through said shutter.

3. An optical system for a high speed motion picture camera having a movable film strip and an objective lens system adapted to transmit a beam of light into the camera, comprising a film sprocket having teeth adapted for engagement with sprocket holes in a strip of film moving therepast for rotating said sprocket about an axis, a multiple facet motion compensating refracting prism connected to said sprocket for joint rotation therewith about the same axis and positioned in said beam of light, a rotary segmented type disk shutter connected to said sprocket and prism for joint rotation therewith about the same axis and formed for interrupting the beam of light entering the camera through the objective lens system, and optical means mounted with respect to said axis in position to intercept and direct onto the film strip the beam of light passing through said shutter and said prism.

4. An optical system for a high speed motion picture camera as described in claim 3 and wherein said optical means includes a series of reflecting surfaces positioned to intercept the interrupted beam of light passing through said shutter and direct said beam of light through said rotating prism and onto the film strip at a position substantially adjacent to said sprocket.

5. An optical system for a high speed motion picture camera as described in claim 3 and wherein said optical means includes a re-imaging lens system mounted in said path of light between said shutter and said film strip, said re-imaging lens system being formed for picking up the image resolved at the back focal plane of the objective lens system and refocusing the beam of light to produce a sharp image at the plane occupied by the emulison of the film strip.

6. An optical system for a high speed motion picture camera as defined in claim 5 and wherein means is provided for mounting a framing mask at the plane coincident with the rear focal plane of the objective lens system, said framing mask being formed with a frame opening therethrough removably supported in said means in the beam of light entering the camera through the objective lens system, said mask being adapted for supporting fiducial indicia in said first named plane.

7. An optical system for a high speed motion picture camera having a movable film strip and an objective lens system adapted to transmit a beam of light into the camera, comprising a film sprocket having teeth adapted for engagement with sprocket holes in a strip of film moving therepast for rotating said sprocket about an axis, a multiple facet motion compensating refracting prism connected to said sprocket for joint rotation therewith about the same axis and positioned in said beam of light, a rotary segmented type disk shutter connected to said sprocket and prism for joint rotation therewith about the same axis and formed for interrupting the beam of light entering the camera through the objective lens system, a film gate adapted for receiving the moving strip of film and holding the same in substantially flat condition as it leaves said sprocket, and optical means mounted with respect to said axis and said film gate in position to intercept and direct onto the film strip in the film gate the beam of light passing through said shutter and prism.

8. An optical system for a high speed motion picture camera having a moving film strip and an objective lens system, comprising a film gate adapted for slidably supporting said film in substantially flat condition, a film sprocket positioned tangentially adjacent to said film gate and being formed with teeth adapted for engagement with sprocket holes in the strip of film moving therepast for rotating said sprocket about an axis, a multiple facet motion compensating prism secured to said sprocket for joint rotation therewith about said axis, a rotary segmented type disk shutter secured to said prism at the end opposite to said sprocket for joint rotation with said sprocket and said prism about said axis, said shutter being positioned in the beam of light entering the camera through the objective lens system, a reflecting surface formed and positioned for receiving the interrupted beam of light from said shutter and for projecting said beam of light through said prism, a second reflecting surface mounted on the side of the prism opposite the first named reflecting surface and formed for deflecting the beam of light at an angle to its path through said prism, a third reflecting surface formed and positioned to intercept the beam of light from said second reflecting surface and direct the beam of light at an angle, a fourth reflecting surface formed and positioned to receive the beam of light from said third reflecting surface and to deflect said beam of light onto the film strip passing through said film gate, and a re-imaging lens positioned between said third and fourth reflecting surfaces and formed for refocusing the beam of light to produce a sharp image at the plane of the emulsion of the film.

9. A high speed motion picture camera, comprising a housing, a spindle formed for supporting a motion picture film feed spool, a take-up spindle adapted for supporting a motion picture film take-up spool, a motor connected in driving relation to said take-up spindle, a film gate mounted in said housing and formed for supporting film passing from the feed spool to the take-up spool in a substantially flat plane, a film sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, a rotary segmented type disk shutter connected to said prism and sprocket for joint rotation therewith about the same axis, and optical means including an objective lens system and a system of reflective surfaces supported within said housing in position to intercept the beam of light entering the camera through the objective lens system and to direct said beam of light sequentially through said shutter and said prism and onto the film in said film gate said shutter being formed for interrupting the beam of light entering the camera.

10. A motion picture camera as described in claim 9 and wherein the path of said beam of light is substantially longer than the back focal length of the objective lens used and a re-imaging lens system is interposed between said reflective surfaces in said beam of light for refocusing the image at the film plane.

11. A motion picture camera as described in claim 9 and wherein means is provided for mounting interchangeable framing masks and reticle indicia at the focal plane of the objective lens system, said optical means also including a re-imaging lens system formed to refocus the beam of light passing through said framing masks so as to provide a focused image on said film in said gate.

12. A motion picture camera as described in claim 9 and wherein said housing is formed with a second opening formed for receiving a secondary lens system adapted for focusing on the emulsion of the film strip from the side opposite to the side impinged by the light beam entering the camera through the objective lens system for effecting direct through-the-lens focusing.

13. A high speed motion picture camera, comprising a housing, a spindle formed for supporting a motion picture film feed spool, a take-up spindle adapted for supporting a motion picture film take-up spool, a motor connected in driving relation to said take-up spindle, a film gate mounted in said housing and formed for supporting film passing from the feed spool to the take-up spool in a substantially flat plane, a film sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, a rotary segmented type disk shutter connected to said prism for joint rotation therewith about the same axis, optical means including an objective lens system and a system of reflective surfaces supported within said housing in position to intercept the beam of light entering the camera through the objective lens system and to direct said beam of light sequentially through said shutter and said prism and onto the film in said film gate, said shutter being formed for interrupting the beam of light entering the camera, and event synchronizing means mounted in said housing and formed with a feeler engaging the roll of film on the feed spool, said event synchronizer being formed for providing an electrical signal in response to movement of said feeler to a predetermined position as film is removed from said feed spool, said electrical signal being adapted for effecting a change in condition at the object being photographed in desired relationship to the amount of film removed from the feed roll.

14. A high speed camera as described in claim 13 and wherein said event synchronizer includes a feeler arm pivotally mounted on said housing and having a distal portion formed for sliding engagement with the outer periphery of a roll of film carried on said feed spool, spring means operatively connected to said feeler arm and formed for biasing said feeler arm in a direction tending to swing said distal portion against the outer periphery of the film roll, event switch means having an actuating portion positioned in the path of movement of said feeler arm and formed for providing an electrical signal when contacted thereby, and mounting means supporting said switch means and formed for adjusting the position of the latter for determining the location at which the actuating portion of said event switch means will be contacted by said feeler arm with reference to the reduction in diameter of the film roll caused by a predetermined amount of film being stripped therefrom.

15. A high speed camera as described in claim 14 and wherein a cut-off switch means is also mounted in said housing and has an actuating portion positioned in the path of movement of an extension of said feeler arm, said cut-off switch means being adapted for connection into the electrical supply circuit for said motor and formed for shutting off power to said motor when the cut-off switch means is actuated by movement of said feeler arm thereagainst.

16. A high speed motion picture camera, comprising a housing, a spindle formed for supporting a motion picture film feed spool, a take-up spindle adapted for supporting a motion picture film take-up spool, a motor connected in driving relation to said take-up spindle, a film gate mounted in said housing and formed for supporting film passing from the feed spool to the take-up spool in a substantially flat plane, a film sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, a rotary segmented type disk shutter connected to said prism for joint rotation therewith about the same axis, optical means including an objective lens system and a system of reflective surfaces supported within said housing in position to intercept the beam of light entering the camera through the objective lens system and to direct said beam of light sequentially through said shutter and said prism and onto the film in said film gate, said shutter being formed for interrupting the beam of light entering the camera, and centrifugal clutch means interposed in the connection between said motor and said take-up spool spindle whereby the motor can accelerate the film smoothly up to speed without imposing excessive stresses.

17. A motion picture camera described in claim 16 and wherein said centrifugal clutch means includes a drum secured to said spindle for rotation therewith, a member rotatable within said drum and secured to the shaft of said motor for rotation therewith, said member being formed with a plurality of radial slots, a plurality of shoe elements mounted in said slots for radially sliding movement outwardly into engagement with the inner periphery of said drum, and a plurality of springs in said slots between the member and the shoe elements for urging the latter outwardly toward said brake drum.

18. A motion picture camera as defined in claim 17 and wherein a gear reducing means is mounted in cooperating relation with said centrifugal clutch means for slowing the speed of rotation of the take-up spindle below the speed of rotation of said motor.

19. A motion picture camera as defined in claim 18 and wherein said gear reducing means includes a jack shaft supported for endwise movement in said housing between first and second terminal positions, a plurality of reduction gear sets secured to said jack shaft and to said drum and said motor and formed for intermeshing engagement when said jack shaft is moved to one terminal position and disengagement when said jack shaft is moved to its other terminal position, said gear sets being formed for transmitting rotative motion from said motor to said drum at a number of revolutions per minute less than the revolutions per minute of the motor, the frictional engagement between said shoe elements and said member being of a low enough value to permit slippage therebetween when said gear sets are in intermeshed condition.

20. A high speed motion picture camera, comprising a housing, a supply spindle formed for supporting a motion picture film feed spool, a take-up spindle adapted for supporting a motion picture film take-up spool, a motor connected in driving relation to said take-up spindle, a film gate mounted in said housing and formed for supporting film passing from the feed spool to the take-up spool in a substantially flat plane, a film sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, a rotary segmented type disk shutter connected to said prism for joint rotation therewith about the same axis, optical means including an objective lens system and a system of reflective surfaces supported within said housing in position to intercept the beam of light entering the camera through the objective lens system and to direct said beam of light sequentially through said shutter and said prism and onto the film in said film gate, said shutter being formed for interrupting the beam of light entering the camera, and brake means mounted in the camera housing and formed for exerting a controlled drag on said feed spool so as to prevent overriding and backlash, said brake means including a shaft extending in coaxial relation from said spindle, bearing means on said housing journaling said shaft, a thrust collar secured to said shaft and engageable with the bearing means to prevent axial movement, a clutch ring journaled on said shaft and formed with an axial slot in its periphery, a screw connected to said housing and engaged in said axial slot to restrain rotation of said ring while providing freedom of axial movement, screw means formed for exerting a controlled amount of axial thrust against said clutch ring toward said thrust collar, spring means interposed between said clutch ring and said screw means, and a clutch disk formed of cork with a molybdenum disulfide coating positioned between said clutch ring and said thrust collar.

21. A high speed motion picture camera, comprising a housing, a spindle formed for supporting a motion picture film feed spool, a take-up spindle adapted for supporting a motion picture film take-up spool, a motor connected in driving relation to said take-up spindle, a film gate mounted in said housing and formed for supporting film passing from the feed spool to the take-up spool in a substantially flat plane, a film sprocket journaled in said housing adjacent to said film gate and formed with teeth adapted for engagement with sprocket holes in the strip of film moving through the film gate for rotating said sprocket about its axis, a multiple facet motion compensating prism connected to said sprocket for joint rotation therewith about the same axis, a rotary segmented type disk shutter connected to said prism for joint rotation therewith about the same axis, optical means including an objective lens system and a system of reflective surfaces supported within said housing in position to intercept the beam of light entering the camera through the objective lens system and to direct said beam of light sequentially through said shutter and said prism and onto the film in said film gate, said shutter being formed for interrupting the beam of light entering the camera, a neon lamp timing light mounted in said camera housing and adapted for connection to a pulsating source of electrical current, and a subhousing supporting said neon lamp, said subhousing being formed with a lamp receiving well and a straight passage between said well and an edge portion of the film strip adjacent to said sprocket, the inner surface of said well and passage being polished whereby said passage will act as a light pipe and provide a relatively intense concentrated dot of light on the film edge.

References Cited by the Examiner
UNITED STATES PATENTS

| | | | |
|---|---|---|---|
| 1,262,255 | 4/1918 | Rector | 352—175 |
| 1,750,220 | 3/1930 | Fritts | 352—174 |
| 1,944,024 | 1/1934 | Foster et al. | 352—92 |
| 2,390,389 | 12/1945 | Redler | 352—180 |
| 2,476,503 | 7/1949 | Maytum | 352—119 |
| 2,476,504 | 7/1949 | Maytum | 352—119 |
| 2,494,082 | 1/1950 | Baird | 352—84 |
| 2,821,106 | 1/1958 | Ranft et al. | 352—84 |
| 2,860,542 | 11/1958 | Kudar | 352—119 |

JULIA E. COINER, *Primary Examiner.*